(No Model.) 5 Sheets—Sheet 4.

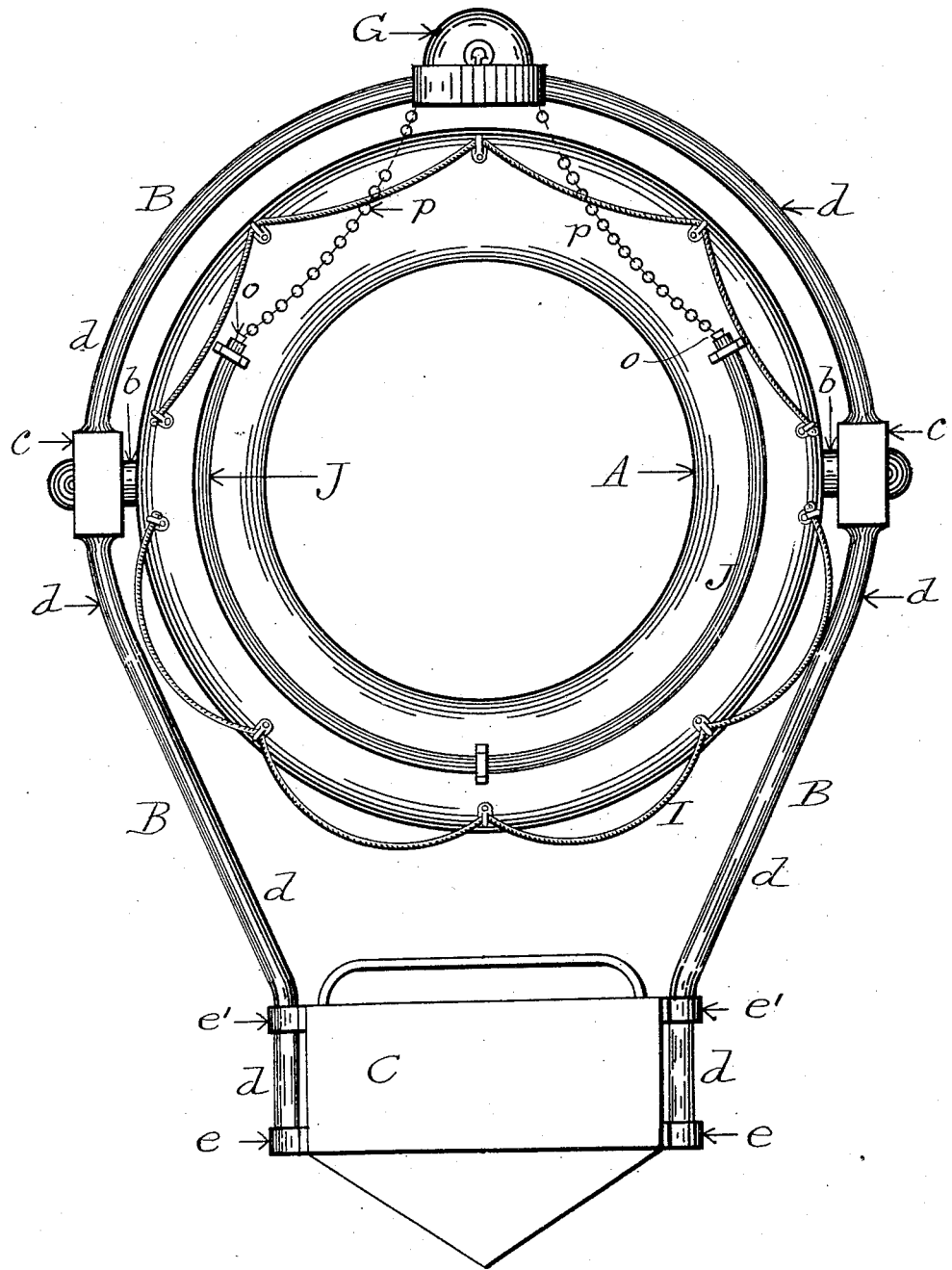

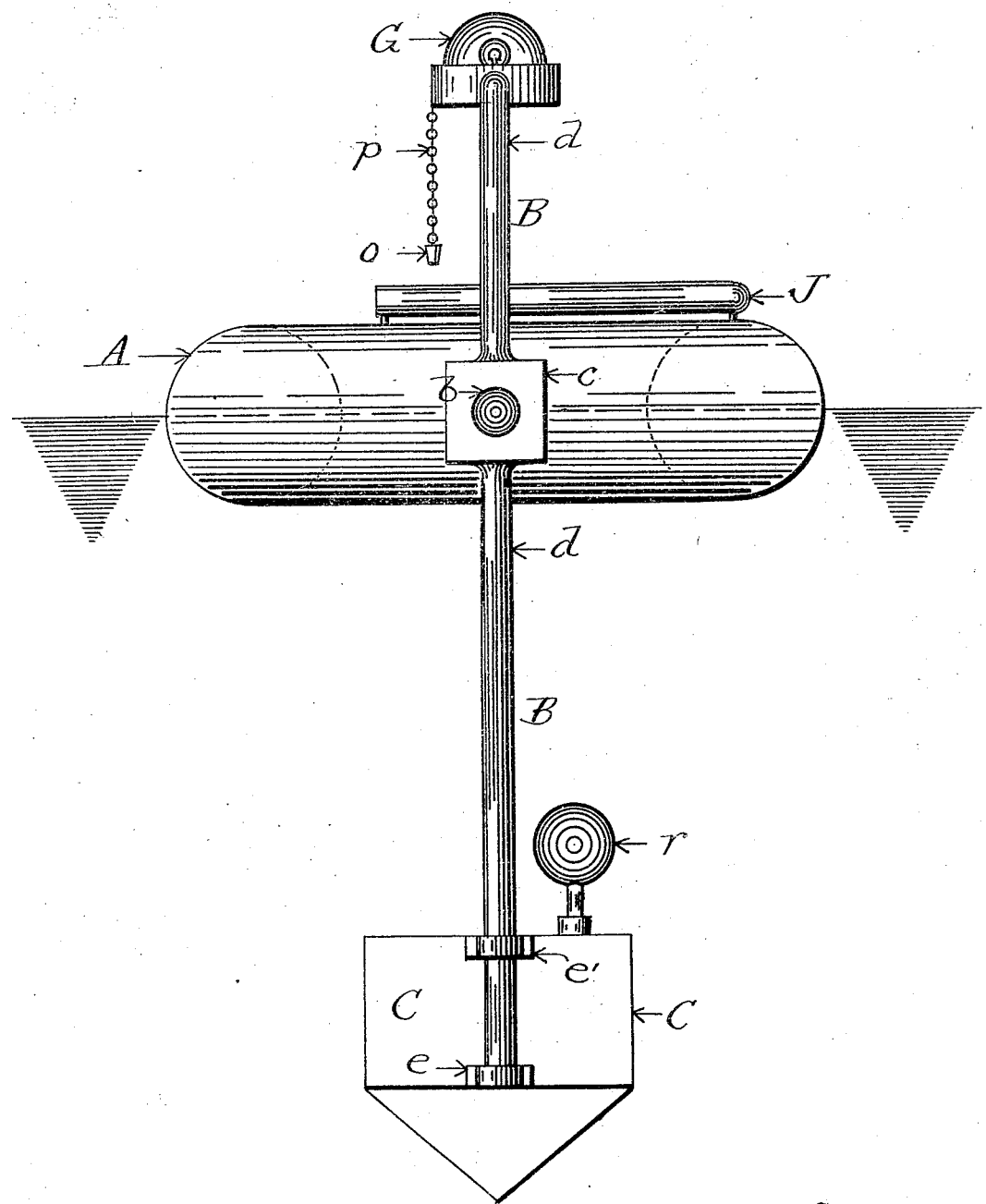

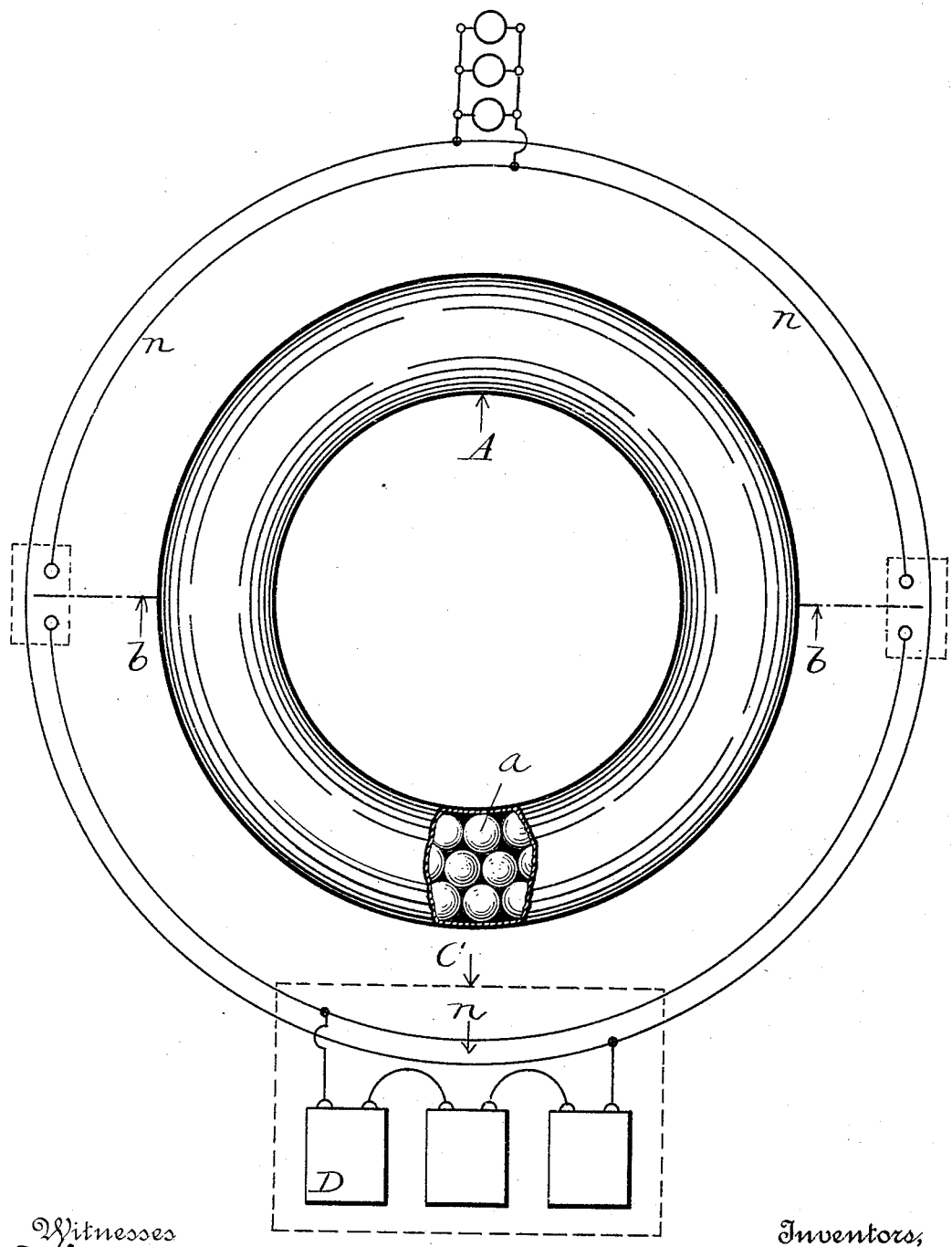

J. A. GUEST & J. H. BATES.
MARINE LIFE SAVING APPARATUS.

No. 551,081. Patented Dec. 10, 1895.

Witnesses
Arthur Ashley
G. M. Copenhaver

Inventors,
J. ALDEN GUEST,
JAMES H. BATES,
By their Attorneys,
Dodge & Sons (No Model.) 5 Sheets—Sheet 5.
J. A. GUEST & J. H. BATES.
MARINE LIFE SAVING APPARATUS.
No. 551,081. Patented Dec. 10, 1895.
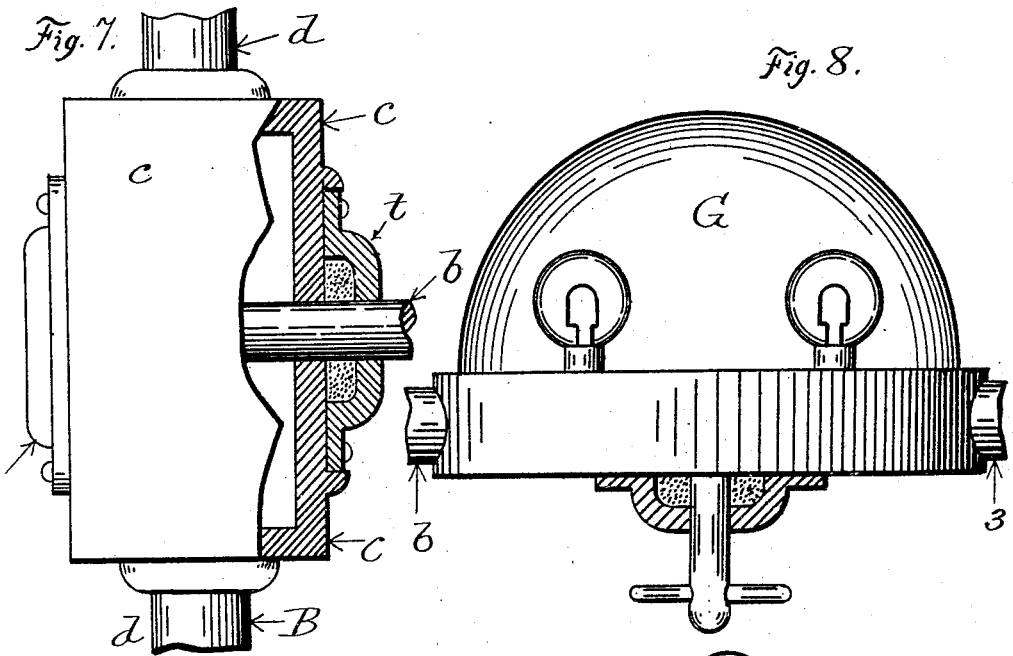
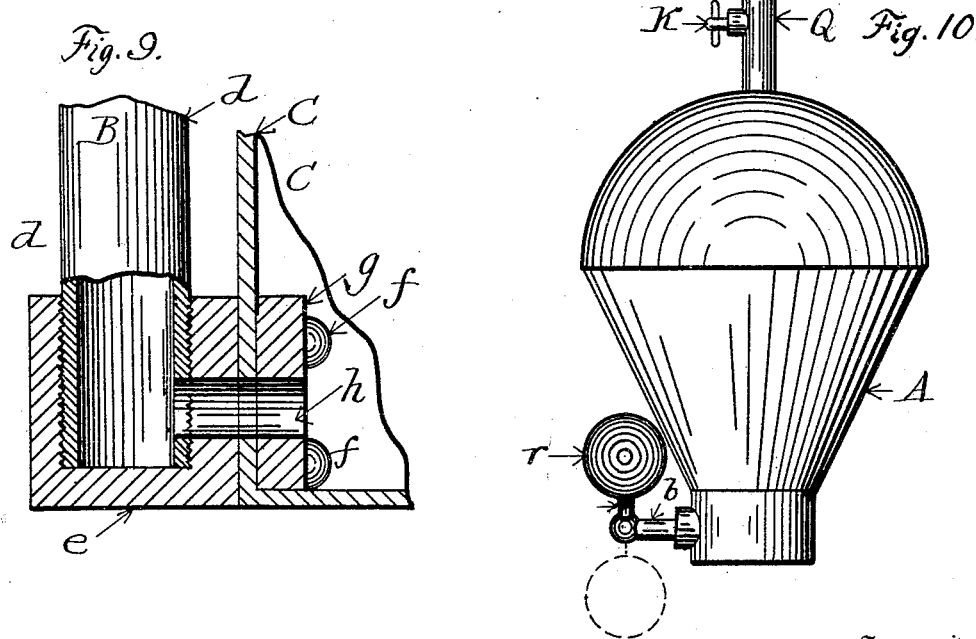
Witnesses
Arthur Ashley
G. M. Cofenhav
Inventors,
J. ALDEN GUEST
JAMES H. BATES.
By their Attorneys,
Dodge & Sons

UNITED STATES PATENT OFFICE.

JAMES A. GUEST, OF WASHINGTON, DISTRICT OF COLUMBIA, AND JAMES H. BATES, OF HOBOKEN, ASSIGNORS TO THE GUEST-BATES MARINE LIFE SAVING APPLIANCES COMPANY, OF HOBOKEN, NEW JERSEY.

MARINE LIFE-SAVING APPARATUS.

SPECIFICATION forming part of Letters Patent No. 551,081, dated December 10, 1895.

Application filed August 8, 1894. Renewed October 5, 1895. Serial No. 564,814. (No model.)

*To all whom it may concern:*

Be it known that we, JAMES A. GUEST, residing at Washington, in the District of Columbia, and JAMES H. BATES, residing at Hoboken, in the county of Hudson and State of New Jersey, citizens of the United States, have invented certain new and useful Improvements in Marine Life-Saving Apparatus, of which the following is a specification.

Our invention relates to life buoys, floats, and similar structures and is in the nature of an improvement upon the device for which Letters Patent of the United States were granted to us, bearing date the 16th day of January, 1894, and numbered 512,957.

The purposes of the present invention are to render the apparatus more prompt and certain in action, simple in construction, and durable in use. To this end we employ an automatic switch for closing the lamp-circuit so constructed and arranged as that it shall close or complete a lamp-circuit when the device enters the water and assumes its position therein.

Various other features, details, and combinations enter into the invention, as hereinafter explained.

Figure 6:
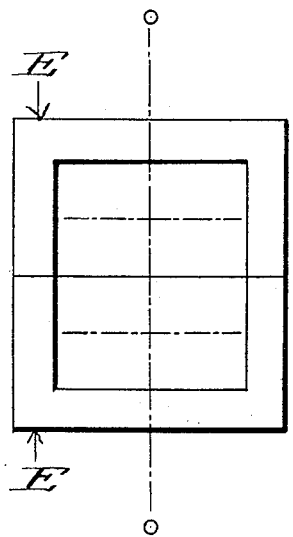
Figure 4:
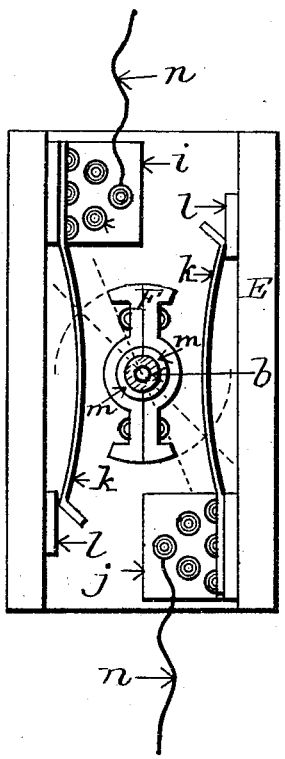
Figure 5:
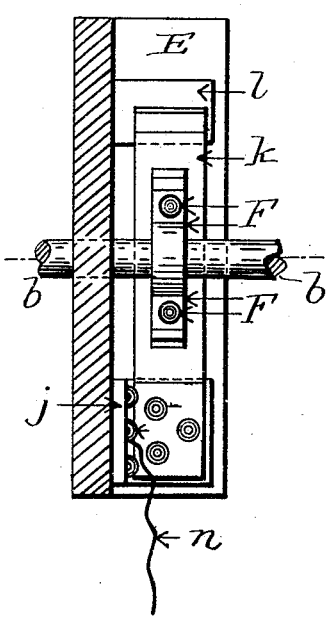

In the accompanying drawings, Figure 1 is a side or face elevation of a life-buoy embodying our invention, the float and frame being represented in a vertical position or in a common plane, which is the relation said parts occupy when the device is not in use; Fig. 2, a side elevation of the device with the parts in the positions they assume when in the water; Fig. 3, a diagrammatic view showing the electric circuits; Figs. 4, 5, and 6, detail views illustrating the construction of the trunnion-switch; Fig. 7, a sectional view of the box inclosing the switch and attendant parts; Fig. 8, an elevation of the lantern and connected parts; Fig. 9, a sectional view of the junction or union connecting the battery-box and the tubular frame through which the circuit-wires pass; Fig. 10, an elevation of a modified form of buoy embodying our invention.

In the accompanying drawings, A represents a float, which we prefer to make of aluminum, because of its lightness and strength and its freedom from injury by salt-water. To guard against sinking of the float in the event of its being punctured and also to sustain it more or less against collapse, we propose in some instances to fill or partially fill it with hollow rubber balls $a$, as shown in Fig. 3.

The float A is provided on opposite sides with trunnions or journals $b$, extending radially from its outer sides and adapted to enter boxes $c$ of a frame B, which is made of metal tubing and of the form best shown in Fig. 1—that is to say, its upper portion is of a generally-circular form concentric with the float A, while its lower portion extends downward and inward, giving to the entire frame a general pear shape. The lower ends of the tubes $d$, constituting the frame B, carry a box C, which is designed to contain battery-cells D, and the lower surface of which is made to converge to a point or narrow edge to facilitate its entrance into the water without undue jar or concussion.

By referring to Fig. 9 the construction of the connection between the tube $d$ of frame B and the battery-box C will readily be understood. The lower ends of the tubes $d$ are threaded, and upon the threaded end of each is screwed a block $e$. Each block is secured to one end of the box C by screws $f$ passing through a strengthening-block $g$ and through the end wall of the box C into the block $e$, as shown in Fig. 9. An opening $h$ is formed through the block $e$, the end wall of box C, and the block $g$, as shown in Fig. 9, to permit the passage of the wires from the battery-cells D to the tubular frame B, and thence to the switches and lamps hereinafter referred to. The tubes $d$ of the frame B pass also through loops or blocks $e'$, similar to the blocks $e$, but near the top of the box C, for the purpose of making a strong connection between the frame and said box and preventing the latter from tipping or getting out of proper relation to the frame.

Fig. 7 shows in partial section the box $c$, constituting a part of the frame B and designed to receive the journals or trunnions $b$ of the float A, there being two of these boxes, one at either side of the frame, as plainly shown in Fig. 1. At the inner side, or the side nearest the float, each box $c$ is provided with an opening of a size to receive and closely fit the journal $b$, and as it is important that no water should enter the box and thus short-circuit the current the journals are provided with stuffing-boxes or glands $t$, as shown in Fig. 7. In order that a tight joint may be formed where the journal enters the box, we employ packing material possessing good lubricating properties. For this purpose wicking saturated with tallow, plumbago, or equivalent material may be used.

Within each box $c$ is arranged a switch or circuit-closer, preferably of the form and construction represented in Figs. 4 and 5. This switch comprises, first, an insulating-block E, consisting of a flat plate or back and two raised sides at right angles thereto, two of such blocks being represented with the edges of their side walls abutting. This double arrangement is designed for use in the event that a double switch is to be employed, as will sometimes be done for precautionary purposes. Secured to the side walls of each block E are two metallic plates $i$ and $j$, carrying spring-arms $k$, the free ends of which are bent to form narrow bearing edges, which rest and slide upon metallic blocks $l$, as shown in Figs. 4 and 5.

F indicates the movable member of the switch or circuit-closer, consisting of an I-shaped metallic head carried by, but carefully insulated from, the trunnion $b$. For convenience the head F is made in two parts, each having a semicircular recess to receive an insulating-sleeve $m$, which is interposed between the head F and the journal, as shown in Fig. 4, and which may likewise be conveniently made in two parts. The head F being rigidly secured upon the trunnion $b$, it follows that if said trunnion be turned relatively to the frame B it will cause the head F to turn correspondingly and will carry the same into contact with the springs $k$ $k$, which through the blocks $i$ and $j$ are in electrical connection with the interrupted circuit-wires $n$.

As shown in Fig. 4, the ends of the head F are curved or made concentric with the axis of the trunnion $b$, and the end faces are so extended that a movement of the head F through a comparatively small arc shall cause said head to come into contact with the springs $k$ and to remain in contact therewith, even though there be considerable movement of the springs $k$ or of the frame B, in which the switch is mounted, relatively to the head F carried by the trunnion or float. In practice two such switches are employed, one for each of the trunnions $b$, and the wires constituting the lamp-circuit are run to both switches and from each switch to the lamps, as shown in Fig. 3, thus giving two all-wire circuits for the lamps and insuring their proper glowing, even though one or the other of the switches or circuits be impaired. The importance of this precaution is apparent when it is borne in mind that these buoys when carried by vessels or kept about a pier or light-house ready for use often remain for long periods unused and uninspected and in many cases are subject to more or less rough usage. Injuries are therefore liable to be incurred which might utterly destroy the usefulness of the device were it dependent upon a single circuit and circuit-closer. By providing two independent circuits the chances of finding the device unfitted for use or incapable of proper operation are vastly reduced.

G indicates a lantern secured upon the top of the frame B and provided with one or more incandescent electric lamps which are arranged in circuit with the battery-cells D or, in other words, are included in the metallic circuits $n$.

When not in use the buoy is designed to have its parts in the relation represented in Fig. 1, which result may be insured by providing a suitable frame or support for the buoy or by hanging the same against a flat surface. When in this position the head F of the switch will bear the relation to the contact-springs $k$ indicated in Fig. 4, and the circuit will consequently be interrupted at both of the switches.

When the device is thrown into the water the greater weight of the battery-box C causes it to descend first, and its pointed bottom cleaving the water permits it to enter readily into the same without material jar or concussion. The float A upon striking the water naturally assumes a horizontal position by reason of its buoyancy, and in so doing turns the trunnions $b$ and the switch-heads F to a corresponding horizontal position, while the switch-blocks E, with their springs $k$ being carried by the frame B, are held in a substantially vertical position owing to the weight of the battery-box C.

In rough water there will be more or less movement of the float A and frame B, one in relation to the other; but owing to the extended contact-surfaces of the switch-head F and springs $k$ no movement that can be thus produced will destroy or interrupt the contact between the parts of the switch.

From this explanation it will readily be seen that so long as the buoy is in its normal condition of disuse the battery-circuit is interrupted and the cells remain inactive; but the moment the buoy enters the water the circuit is completed and the battery-cells become active.

The lamps employed will be of low voltage, so as to be readily rendered incandescent by the current of such cells as can be conveniently carried in the chamber C without unduly loading the buoy.

The dimensions of the float will of course be made with due reference to the weight of the frame B, box C, and cells carried in said box.

In order that the device may be readily availed of by persons in the water, the float A is provided with a life-line I, conveniently looped upon the same to afford hand-holds, as shown in Fig. 1.

To lessen the wave-motion about the buoy and facilitate the reaching thereof by persons in the water, we propose to provide the buoy with an oil-receptacle, which shall be opened when the buoy strikes the water and assumes its floating position, the oil being then discharged upon the water and serving to still the same, as is well understood. In Figs. 1 and 2 we have represented the oil-receptacle as made in the form of a tube J and secured to the upper face of float A, its ends being temporarily closed by plugs or stoppers o, attached to chains p, the other ends of which are made fast to the upper part of frame B or to the lantern-base constituting a portion of said frame.

When the parts are in their normal position of disuse, the chains p will be slack and the plugs or stoppers o will remain firmly seated in the ends of the tube J; but when the float A swings to its horizontal position or at right angles to the frame B the chains will become taut and the stoppers will be withdrawn from the tube, as will readily be understood upon reference to Figs. 1 and 2. In this way we insure the discharge of oil upon the water at the precise time and place required and thereby enable the buoy to be seen and availed of more readily than it otherwise could be.

In Fig. 10 we have represented a different form of buoy or such as is commonly employed in the harbors and along the courses of vessels in lakes, bays, and rivers. This comprises a float or shell A, of convenient shape, having a mast Q rising from its top and carrying the lantern G, which will or may be of the same construction as that shown in Figs. 1 and 2. At its lower end the float carries a switch of the same general construction as that described in connection with Figs. 4 and 5 or of any equivalent construction, but having its trunnion or shaft b provided with a float r, which when out of the water acts as a weight to open the switch and interrupt the circuit, and when in the water serves to turn the shaft b to close the circuit through the switch. In addition to this automatic switch a manual switch K may be provided whereby to interrupt the circuit during such hours as a light is not required.

In Fig. 2 we have represented the battery-box C as provided with a small float r, carried by a vertically-moving stem, which may be furnished within the box C with a switch of any suitable or convenient construction, which shall be closed by the rise of the float and opened by its fall. This may be used with or independently of the trunnion-switches, or the trunnion-switches may be used for one metallic circuit and the float r with its switches used in an independent circuit, so that the circuit may be completed in one way or another despite any injury that is likely to happen to the structure.

It will be readily perceived that the form and proportion of parts, the details of construction of the switches and other minor matters may be greatly varied without departing from the spirit or scope of our invention, the illustrations here given being designed to give a clear idea of a practical and desirable embodiment of our invention, without, however, being in any manner exclusive of other forms embodying the same general principles and features of construction.

Wherever the movable stem or spindle carrying the switch-head enters the framework or the buoy it will of course be provided with a packing-gland, as shown.

We are aware that life rafts or buoys have heretofore been provided with an oil receptacle; but so far as we know it is new to combine with such receptacle a closure by which evaporation and escape of oil shall be prevented when the buoy is not in use, but which shall be automatically withdrawn or opened in and by the act of bringing the buoy into use or putting it overboard. The embodiment of this idea may be varied within quite wide limits, one advantageous form being illustrated in the drawings.

Having thus described our invention, what we claim is—

1. In a buoy or like structure, the combination of a frame and a float movable one in relation to the other, an electric lamp and a source of electric energy carried by the buoy, and a switch included in circuit with the lamp and source of energy, and adapted to be closed by the relative movements of the frame and float.

2. In a buoy, the combination of a rigid and continuous main frame and a float journaled or pivoted in said frame, and adapted to be thrown into plane therewith for convenience of storage, and to move out of plane therewith to rest properly upon the water and support the frame.

3. In combination with a frame B provided with an electric lantern, a battery box C, and conductors for connecting the battery cells and the lantern, a float A journaled in said frame, and a switch carried by the journal of the frame and serving to open and close the circuit as the float is turned relatively to the frame.

4. In combination with a float A, a tubular frame B, a battery box C, a lantern G carried by said frame, conductors n extending through said frame from the battery to the lantern, and a switch composed of two members, one carried by the frame and the other by the trunnions of the float, substantially as and for the purpose set forth.

5. In combination with frame B provided with an electric lantern and with a source of electrical energy, conductors n for connecting the lantern with said source of energy; a float A journaled in the frame, and a switch comprising spring arms k carried by the frame, and rotatable head F carried by the trunnion of the float.

6. In combination with a float A, provided with trunnions or journals b; a frame B provided with a source of electric energy, a lamp, and boxes c adapted to receive the journals or trunnions; a switch contained within one of said boxes and having one member carried by the trunnion; and circuit connections between the source of energy and the switch, and between the switch and lamp, substantially as described and shown.

7. In combination with a float A, a tubular frame B, a lamp carried by said frame, a box C adapted to contain a source of electric energy, and a block e, connecting the frame B and box C and provided with a passage h through which to lead wires from the source of energy to the lamp, substantially as and for the purpose set forth.

8. In combination with a float A provided with trunnions b, frame B provided with a lamp, box C carried by said frame and provided with a source of electric energy, electric conductors connecting the lamp and the source of energy, and stuffing boxes or glands t encircling the trunnions for the purpose of excluding moisture and thereby preventing short circuiting of the current.

9. In combination with a buoy provided with an electric lamp and with a source of electric energy, an automatic mechanical switch adapted to complete a circuit through conductors, from the source of energy to the lamp, when the float is moved out of plane with the frame.

10. In a life saving apparatus, the combination of a source of electric energy, an electric lamp, and conductors connecting said parts, a two-part mechanical switch or circuit closer included in circuit with the lamp and source of energy, and a float connected with and serving to actuate or close the switch when the float reaches the water.

11. In a life saving apparatus, the combination of a tubular frame, a lamp and a source of electric energy carried by said frame, a float movable relatively to the frame, a switch or circuit closer located within the frame and carried by a trunnion or shaft of the float, and a packing gland surrounding the trunnion or shaft and serving to exclude moisture from the frame and switch.

12. In a life saving apparatus, the combination of a frame provided with a lamp, a battery chamber at the lower end of said frame, constituting a weight to hold the same in an upright position, a float journaled in the frame and adapted to carry the frame, and electrical connections between the battery and lamp.

13. In a life saving apparatus, the combination of a frame, a lamp carried by said frame, a battery chamber at the lower end of the frame, and a float journaled in the frame, the lower portion of the battery chamber being beveled to enter the water readily and without concussion.

14. In a life buoy, the combination of a frame, a float carried by and movable relatively to the frame, an oil receptacle carried by one of said parts, and a closure for the receptacle, connected with the other of said parts, substantially as described, whereby the movement of one part relatively to the other in assuming their operative positions, is caused to open the closure and permit the oil to flow from the receptacle, for the purposes explained.

In testimony that we claim the foregoing as our invention we have signed our names in presence of two witnesses.

JAMES A. GUEST.
JAMES H. BATES.

Witnesses to signature of J. A. Guest:
WILLIAM W. DODGE,
WALTER S. DODGE.

Witnesses to signature of J. H. Bates:
CHAS. J. BATES,
ALEX. R. BLACKIE.